United States Patent Office 3,225,698
Patented Dec. 28, 1965

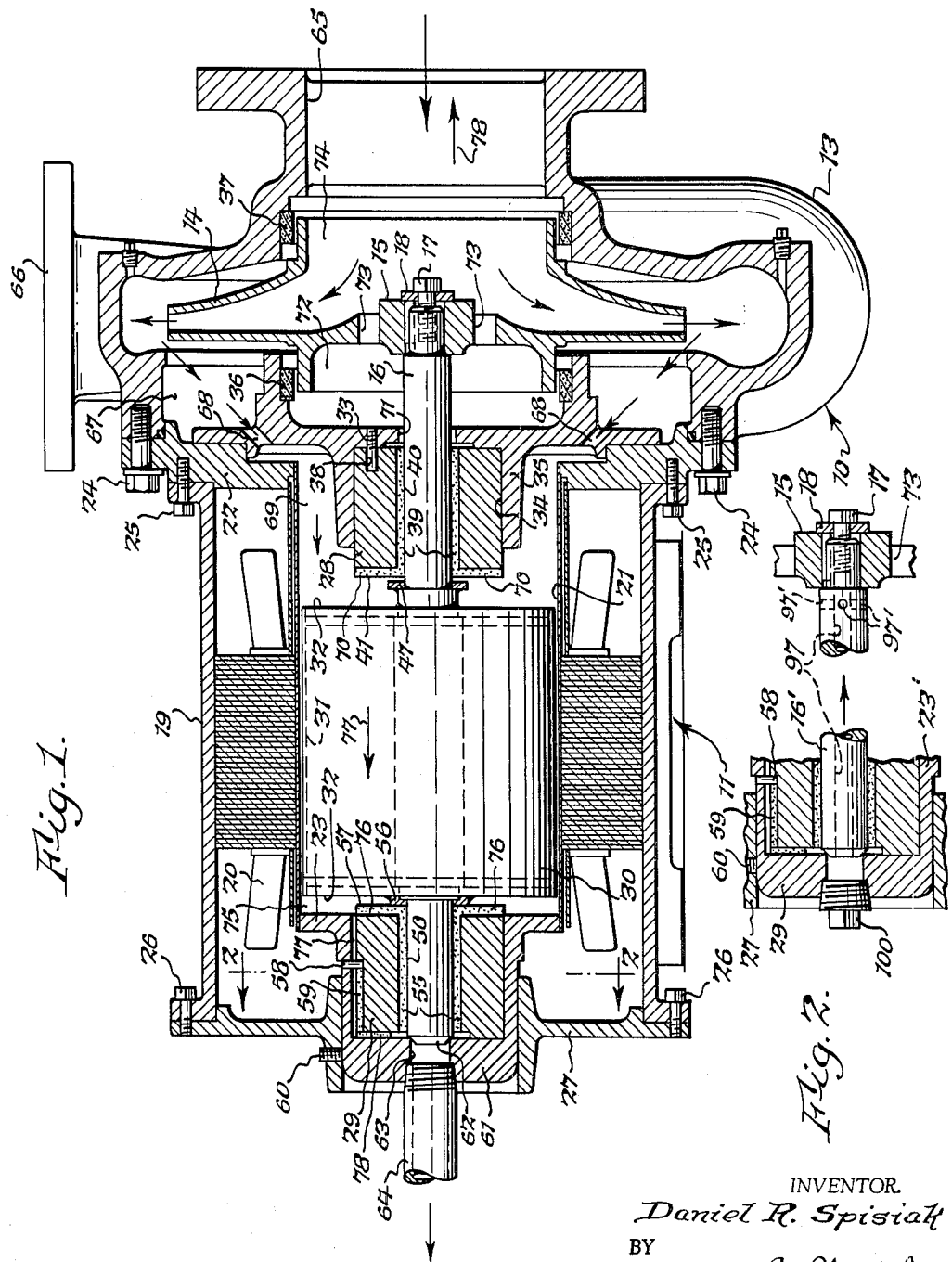

3,225,698
HERMETIC MOTOR-PUMP CONSTRUCTION
Daniel R. Spisiak, Depew, N.Y., assignor to Buffalo Forge Company, Buffalo, N.Y., a corporation of New York
Filed Nov. 29, 1963, Ser. No. 326,685
3 Claims. (Cl. 103—87)

The present invention relates to an improved motor-pump unit of the hermetic type and more particularly to an improved construction for controlling axial thrust of the shaft thereof during operation, to obviate such axial thrust on the bearings associated with said shaft.

A hermetic motor-pump unit consists of a single casing which includes both an electric motor and a pump. The rotor of the motor and the pump impeller are mounted on a common shaft, which is, in turn, associated with suitable bearings, which are subjected to two forces, namely, radial forces due to the throw of the shaft and axial forces due to axial thrust to which the shaft is subjected. The axial thrust is produced in response to the pumping action of the impeller, and the magnitude of the axial thrust varies with the flow through the pump. The axial thrust tends to cause the shaft to move axially.

In the past there have been various ways of treating the above-mentioned axial thrust to limit axial movement of the shaft. Certain methods which were employed included the use of axial thrust bearings. However, this method was subject to certain shortcomings in that the thrust bearings wore out, and when they did, replacement was required. There have also been constructions for reducing the axial thrust hydraulically. However, these were relatively complicated and costly. It is with the controlling of axial thrust in a hermetic motor-pump unit in a simple, expedient and efficient manner that the present invention is concerned.

It is accordingly the object of the present invention to eliminate axial thrust on the bearings of a hermetic motor-pump unit in a simple and expedient manner which requires very little modification of existing structure. Other objects and attendant advantages of the present invention will readily be perceived hereafter.

During the operation of a hermetic motor-pump unit, a portion of the pumped fluid is passed over the rotor for the purpose of cooling the rotor and also for lubricating the bearings in which the rotor shaft is mounted. As noted above, the fluid flow through the impeller creates an axial thrust force in a first direction. However, the flow of fluid across the rotor creates pressure differential which produces an axial thrust force in the opposite direction. In accordance with the present invention, the fluid which is passed across the rotor is utilized to create a variable force which is utilized to balance the thrust produced by the flow of fluid through the impeller under all conditions of operation. When the forces are balanced, the unit consisting of the impeller, the shaft on which it is mounted, and the motor will be at rest in a position where there is no net axial thrust tending to move said unit in either direction. This position, in accordance with the present invention, is always obtained before either of the thrust bearings are subjected to a net axial thrust force, so that wear of the thrust bearings is eliminated. The foregoing is achieved by making the end of the shaft, which is remote from the impeller, of a predetermined configuration, such as a chamfer, which enters, or moves relative to, an aperture in the motor housing to thereby vary the effective size of said aperture as the shaft moves axially to thereby vary the flow of fluid across the rotor. In this manner, the pressure differential across the rotor is controlled, to in turn determine the magnitude of the force which opposes impeller thrust. By way of example, in the event that there is an axial force produced by the impeller tending to move the shaft away from the aperture to thereby in effect increase the size of the aperture, the pressure differential across the rotor, which acts as a piston, will increase to thereby provide a force in opposition to the axial thrust produced by the impeller. The shaft will continue its axial movement under the impeller thrust until the force produced by the pressure differential across the rotor equals the force produced by the impeller thrust so that the shaft will come to rest before engaging the thrust bearing toward which it moved, and therefore there will be no axial thrust on said bearing. On the other hand, if the pressure differential across the rotor is such as to tend to cause the rotor to move in a direction which is in opposition to the impeller thrust, the aperture will tend to be closed down by the chamfered end of the shaft so as to decrease the pressure differential across the rotor until such time as the axial force caused by pressure differential across the rotor equals the impeller thrust and thereby causes the unit consisting of the impeller, rotor and shaft to come to rest before engaging the thrust bearing toward which it was moving, and therefore there will be no axial thrust on said bearing. The present invention will be more fully understood when the following portions of the specification are read in conjunction with the accompanying drawings wherein:

FIG. 1 is a cross sectional view of a hermetic motor-pump unit containing the construction of the present invention; and FIG. 2 is a fragmentary cross sectional view of an alternate flow path for fluid in the motor-pump unit.

In FIG. 1 there is shown a hermetic motor-pump unit having a pump portion 10 and a motor portion 11. The pump 10 includes a casing 13 in which is located an impeller 14, the central portion 15 of which is mounted on the end of rotor shaft 16 and secured thereto as by screw 17 and washer 18.

The motor 11 includes a field shell casing 19 having a stator 20 suitably mounted therein. Casings 13 and 19 essentially produce a single housing. A stator liner 21 extends between adapter flange 22 and the right end of bearing cap 23 to prevent fluid which passes through the motor, in a manner to be described more fully hereafter, from contacting the stator assembly 20. The adapter flange 22 is secured to casing 13 by means of screws 24. Mounted on the end of rotor shell casing 19 remote from adapter flange 22, by means of screws 26, is a front hood 27 which in turn mounts bearing cap 23.

Mounted for rotation in bearings 28 and 29 is the above-mentioned rotor shaft 16 which mounts rotor core assembly 30 having a liner 31 thereon to protect it from the fluids which pass through the motor. The rotor is sealed by end plates 32. Bearing 28 is received in portion 34 of wearing ring housing 35 which is mounted on adapter flange 22 and in turn mounts wearing ring 36. A second wearing ring 37 is mounted on casing 13. Wearing rings 36 and 37 are preferably made of carbon and tend to maintain impeller 14 rotating about the true axis of shaft 16. Wearing rings 36 and 37 are preferably press fitted into the members on which they are mounted.

Bearing 28, which may be made of a suitable graphite material, is of cylindrical external configuration and is held against turning in wearing ring housing 35 by screw 33, a portion of which fits into an aperture 38 in said bearing. Bearing 28 includes a plurality of slots 39 circumferentially spaced about the inner surface 40 of the bearing to conduct fluid and thereby make said fluid available for lubricating the internal portion 40 of bearing 28 which is in engagement with shaft 16. Bearing 28 also includes an end portion 41 which acts as an end thrust bearing in a manner to be described in more detail hereafter.

Bearing 29 is mounted in bearing cap 23 and is held against rotation therein by a pin 58 extending into keyway 59 of bearing 29. Bearing 29 will remain in the position shown by virtue of the pressures in the pump. However, if desired, a suitable arrangement, such as a screw, extending into bearing 29 from bearing cap 23 may be used to securely hold bearing 29 in position. Bearing 29 is of substantially cylindrical configuration and has an internal cylindrical surface 50 which receives the left end of shaft 16. Internal surface 50 has a plurality of longitudinal slots 55 formed therein for the purpose of receiving the fluid which is being pumped and thereby making it available for lubrication of the shaft. Bearing 29 has an end portion 57 which acts in the manner of a thrust bearing, as will be more fully described in detail hereafter.

Collars 47 and 56 are mounted on shaft 16 for rotation therewith. It is to be noted that when shaft 16 is in the position shown in FIG. 1 with thrust collar 56 engaging end thrust bearing 57, there is a clearance between thrust collar 47 and end thrust bearing 41. This clearance permits shaft 16 to move axially during rotation. Stated another way, it can be seen that the spacing between end bearings 41 and 57 is greater than the spacing between the outer surfaces of collars 47 and 56 to thereby permit shaft 16 to move axially during rotation.

In accordance with the present invention, a throttle plate 61 forms a part of bearing cap 23. Alternatively, the throttle plate may be made separate from and attached to bearing cap 23. The end of shaft 16 has a chamfer 62 thereon. It can readily be seen therefore that as shaft 16 moves to the right, the spacing between the aperture 63 and chamfer or taper 62 will increase, whereas when shaft 16 moves to the left the spacing between chamfer 62 and aperture 63 will decrease. By varying this spacing, the amount of fluid which passes into conduit 64 leading from the motor pump unit will be varied to thereby vary the amount of axial thrust which is produced by the unit consisting of the shaft 16 with the rotor 30 and impeller 15 mounted thereon, as will become more apparent hereafter.

During pump operation, the fluid which is being pumped enters casing 13 through inlet 65 and thereafter is forced through outlet 66 by the rotation of impeller 14. This path of flow is indicated by the arrows. However a certain portion of the flow moves into chamber 67 and then into chamber 69 through a plurality of holes 68 in the plate portion (not numbered) of wearing ring housing 35. A portion of the fluid then passes into slots 70 in the face of the end thrust bearing 41, each of said slots being in communication with a slot 39. It will be appreciated that any number of slots 39 and 70 may be provided, for example, four of each spaced 90° from each other. After passing through slots 39 and thus providing lubricant for shaft 16, a portion of the fluid passes through enlarged aperture 71 in wearing ring housing 35 and into chamber 72 which is behind impeller 15. A portion of the fluid thereafter passes through balancing holes 73 back into the entry chamber of the pump, because the pressure in chamber 72 is greater than the pressure in entry chamber 74. As is well understood in the art, the size and number of these holes determines the pressure differential across the plate of the impeller in which these holes are located.

However, a portion of the fluid in chamber 69 which does not pass through the bearings in the above-described manner, passes between the outside of the rotor assembly 30 and the stator lining 21, to thereby provide cooling to the rotor and the stator. The clearance between the rotor liner and the stator liner is extremely small. After the fluid passes between the rotor liner and the stator liner, it moves into chamber 75 from whence it passes into radial slots 76 in end thrust bearing 57. One slot 76 is associated with each slot 55 of bearing 29 and is in communication therewith. Thus the fluid which passes into slots 55 from slots 76 acts to libricate shaft 16. It will again be appreciated that a plurality of slots 55 and 57 may be provided, for example, four of each spaced 90° from each other. After leaving slots 55, the fluid passes through aperture 63 in throttle plate 61, the amount of flow being determined by the spacing between said aperture 63 and chamfer or taper 62. It is also to be noted that a slot 77 is provided in bearing cap 23 and a certain amount of the fluid may flow through slot 77 and into slot 78 in communication therewith from whence it flows to aperture 63.

From the foregoing description it can readily be seen that a portion of the fluid which is being pumped serves the functions of lubricating the bearings which mount shaft 16 and of cooling the stator and the rotor of the motor. However, in accordance with the present invention the portion of the fluid which passes between the stator and rotor is additionally utilized in an extremely simple and expedient manner to eliminate end thrust which could produce wear on bearings 41 and 57. More specifically, the flow of fluid across rotor assembly 30 provides a thrust in the direction of arrow 77 in FIG. 1 due to the pressure drop across rotor 30, which acts as a piston because of the small clearance between it and the stator. The reason that rotor 30 acts as a piston is because the right side is subjected to both the static pressure and the dynamic pressure of the fluid in chamber 69. The left side of rotor 30, that is, the side which forms a part of chamber 75, is subjected to a relatively low pressure because it is in communication with the pump intake, in this particular case. However, it may be in communication with any other suitable low pressure source. The thrust force produced by the pumping action of impeller 15 is indicated by arrow 78 in FIG. 1. It can readily be visualized that if the pressure differential across rotor 30 produces a force 77 which is equal to the thrust 78, the rotor will be balanced so that there will be no end thrust on the bearings 41 and 57. The aperture 63 in throttle plate 61, is sufficiently large to give enough flow to give a sufficiently great pressure drop across rotor 30 which balances the thrust 78 of impeller 15 and in this manner the thrust is neutralized so that there will be no wear on bearings 41 and 57. In other words, when the effective size of aperture 63 is relatively small, the pressure in chambers 69 and 75 across rotor 30 will tend to equalize to thereby give a relatively small pressure differential tending to move rotor 30 to the left. However, when the opening is relatively large, the pressure differential will be relatively large and the force tending to move rotor 30 to the left will be relatively large. The clearance between bearing 41 and plate 47 must be sufficiently great so that within the entire range of rotor speeds there can be enough axial movement of shaft 16 so that it will reach a position wherein the force produced by the pressure differential across rotor 30 is equal to the thrust 78 produced by the impeller and when these are equal there will be no axial thrust tending to wear bearings 41 and 57.

Stated another way, the manner in which the instant invention operates is as follows: When there is a relatively large impeller thrust 78 tending to move impeller 15 to the right, the whole unit consisting of impeller 15, shaft 16, and rotor 30 will tend to move to the right. However, this will cause the opening between aperture 63 and chamfer 62 to increase. Therefore the pressure differential 77 across rotor 30 will also increase to provide a force tending to oppose the force which moves impeller 15 to the right. The movement of the unit consisting of impeller 15, shaft 16, and rotor 30 to the right will continue until the force 77 is equal to the force 78 at which time it will stop. When it does stop it will not be in contact with either of bearings 41 or 57 because the clearance between these bearings and the plates 47 and 56 with which they are associated, respectively, is sufficiently great to permit the above described axial movement to occur without contacting said bearings.

On the other hand, assume that the rotor 30 was in a position where the pressure differential 77 across rotor 30 was greater than the force 78 produced by the rotation of the impeller. This would cause the unit consisting of impeller 15, shaft 16 and rotor 30 to move to the left to thereby decrease the spacing between chamfer 62 and orifice 63. This in turn will reduce the pressure differential across rotor 30 until such time as the force 77 equals the force 78 tending to move impeller 15 to the right. At such time axial movement will cease, but it will be appreciated that the clearance described above is sufficiently great so that movement ceases before the end thrust bearing is engaged by the collar on the shaft. It can be seen that the effective area of orifice 63 through which the fluid passes varies at an exponential rate with linear movement of shaft 16. In other words, a linear movement of shaft 16 will cause the position of chamfer 62 to vary relative to orifice 63 and thus effect a linear change in the radius, which in turn produces a change in the effective area of the orifice. By converting a linear movement to a change in area an extremely rapid change in rate of flow is obtained thereby causing shaft 16 to adjust its axial position in an extremely rapid manner.

It will be appreciated that the axial thrust of the impeller varies with the flow through the pump, and that the above described balancing action due to axial movement of shaft 16 is fully automatic in that such movement occurs until such time as the opposing thrust forces are balanced.

In the foregoing manner the axial thrust is controlled in an extremely efficient and simple way and without the utilization of complex hydraulic circuitry and without the addition of added devices or structure to hydraulically balance the motor. In other words, the rotor 30 is caused to act as a piston in addition to functioning as a rotor, and the throttling is effected by merely providing an aperture which is utilized in conjunction with the end of the rotor shaft to thereby vary the effective opening of said aperture depending on the position of the rotor.

Conduit 64 to which the cooling, lubricating and balancing fluid passes from the motor housing conducts said fluid back into the intake to the pump or may conduct it to any other suitable location.

In FIG. 2 an alternate arrangement for disposing of fluid which passes through bearing 29 is shown. This arrangement consists of a bore 97 in shaft 16' for receiving said fluid which passes between the chamfer at the end of the shaft and the aperture in the plate. A plug 100 is located in bearing cap 23' to prevent flow of fluid through the aperture which the plug closes. The fluid passes through bore 97 of shaft 16' and is discharged through radial apertures 97' in the portion of shaft 16' to the left of the impeller. Alternatively, the fluid may be discharged through a bore (not shown) which may be provided in a cap screw 17. Furthermore, if desired, the right end of shaft 16' may be threaded and a nut may be utilized to secure an impeller thereto so that bore 97 discharges into the intake portion 74 of the impeller. It is to be noted that, aside from the above described structure in FIG. 2, the remaining structure may be identical to the structure shown in FIG. 1.

It can thus be seen that the improved hermetic motor-pump unit of the present invention is manifestly capable of achieving the above-enumerated objects and advantages, and while preferred embodiments have been disclosed, it will readily be appreciated that the present invention is not limited thereto but may be otherwise embodied.

I claim:

1. A hermetic motor-pump unit comprising a housing, a motor including a rotor and a stator in said housing, a pump including an impeller in said housing, a shaft having first and second ends, said rotor being mounted on said shaft between said first and second ends, said impeller being mounted to one side of said rotor proximate said first end of said shaft, first and second bearing means for mounting said shaft on said housing, said first bearing means being located to one side of said rotor proximate said impeller and said second bearing means being located on the opposite side of said rotor from said impeller proximate said second end of said shaft, circuit means for conducting a portion of fluid which is pumped by said impeller across said rotor, orifice means in said housing located proximate said second end of said shaft, said orifice means being axially spaced on the opposite side of said second bearing means from said rotor, and a taper formed relative to said second end of said shaft and axially spaced between said second bearing means and said orifice means for varying the effective opening of said orifice means in response to axial movement of said shaft relative to said orifice means to thereby vary the rate of fluid flow through said orifice means and thereby cause said shaft to cease axial movement when a first axial thrust force is produced on said rotor due to the pressure drop of fluid thereacross which is equal and opposite to a second axial thrust force which is due to rotation of said impeller, the location of said taper and said orifice means contributing to the existence of fluid at said second bearing means regardless of the flow through said orifice means.

2. A hermetic motor pump unit as set forth in claim 1 wherein said taper formed relative to said second end of said shaft constitutes a chamfer on said second end of said shaft.

3. A hermetic motor pump unit as set forth in claim 2 wherein said orifice means are circular and wherein said chamfer includes a portion of greater diameter than said circular orifice means to thereby permit selective substantially complete obstruction of flow through said orifice means by said chamfer.

References Cited by the Examiner

UNITED STATES PATENTS

| 2,809,590 | 10/1957 | Brown | 103—112 X |
| 3,031,973 | 5/1962 | Kramer | 103—87 |
| 3,138,105 | 6/1964 | White | 103—87 |

FOREIGN PATENTS 330,605  7/1958  Switzerland.

DONLEY J. STOCKING, *Primary Examiner.*

ROBERT M. WALKER, LAURENCE V. EFNER,
*Examiners.*